US007874916B2

(12) United States Patent
Gentles et al.

(10) Patent No.: US 7,874,916 B2
(45) **Date of Patent: *Jan. 25, 2011**

(54) SECURITY OF GAMING SOFTWARE

(75) Inventors: Thomas A. Gentles, Algonquin, IL (US); Timothy C. Loose, Chicago, IL (US); Wayne H. Rothschild, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 103 days.

This patent is subject to a terminal disclaimer.

(21) Appl. No.: 11/986,846

(22) Filed: Nov. 27, 2007

(65) Prior Publication Data

US 2008/0076549 A1 Mar. 27, 2008

Related U.S. Application Data

(63) Continuation of application No. 10/236,164, filed on Sep. 6, 2002, now Pat. No. 7,320,642.

(51) Int. Cl.
*A63F 13/00* (2006.01)

(52) U.S. Cl. ............................. 463/29; 463/16; 463/20

(58) Field of Classification Search ..................... 463/1, 463/6, 29, 42; 711/164; 726/30
See application file for complete search history.

(56) References Cited

U.S. PATENT DOCUMENTS 4,405,829 A 9/1983 Rivest et al.
4,727,544 A 2/1988 Brunner et al.
5,231,668 A 7/1993 Kravitz
5,643,086 A 7/1997 Alcorn et al.
5,644,704 A 7/1997 Pease et al.
6,026,293 A 2/2000 Osborn
6,071,190 A 6/2000 Weiss et al.
6,099,408 A 8/2000 Schneier et al.
6,106,396 A 8/2000 Alcorn et al.
6,149,522 A 11/2000 Alcorn et al.
6,203,427 B1 3/2001 Walker et al.

(Continued)

FOREIGN PATENT DOCUMENTS

GB 2121569 A 12/1983

(Continued)

OTHER PUBLICATIONS

"Australian Application Serial No. 2003244574 First Office Action mailed on Oct. 16, 2008", 2 pgs.

(Continued)

*Primary Examiner*—Ronald Laneau
*Assistant Examiner*—Ross A. Williams
(74) *Attorney, Agent, or Firm*—Schwegman, Lundberg & Woessner, P.A.

(57) ABSTRACT

A gaming machine to conduct a wagering game comprises a processing apparatus and a secondary apparatus. To inhibit unauthorized persons from replacing some or all of the software executed by the processing apparatus with unapproved software, the processing apparatus transmits a security message to the secondary apparatus. The secondary apparatus, in turn, validates the security message and transmits an enable signal when the validation is successful, or a disable signal when the validation is not successful. The processing apparatus is allowed to access to game data based on receipt of the enable signal and is denied access to game data based on receipt of the disable signal.

23 Claims, 2 Drawing Sheets

U.S. PATENT DOCUMENTS

| | | | | |
|---|---|---|---|---|
| 6,264,557 | B1 | 7/2001 | Schneier et al. | |
| 6,450,885 | B2 | 9/2002 | Schneier et al. | |
| 6,527,638 | B1 | 3/2003 | Walker et al. | |
| 6,565,443 | B1 | 5/2003 | Johnson et al. | |
| 6,595,856 | B1 | 7/2003 | Ginsburg et al. | |
| 6,620,047 | B1 | 9/2003 | Alcorn et al. | |
| 6,685,567 | B2 | 2/2004 | Cockerille et al. | |
| 6,722,986 | B1 | 4/2004 | Lyons et al. | |
| 6,988,250 | B1 | 1/2006 | Proudler et al. | |
| 7,320,642 | B2 * | 1/2008 | Gentles et al. | 463/29 |
| 2002/0166034 | A1 | 11/2002 | Koschella | |
| 2004/0002381 | A1 | 1/2004 | Alcorn | |
| 2004/0038740 | A1 | 2/2004 | Muir | |
| 2004/0048660 | A1 | 3/2004 | Gentles et al. | |

FOREIGN PATENT DOCUMENTS

| | | | |
|---|---|---|---|
| JP | 08141196 | A2 | 6/1996 |
| JP | 10192533 | A2 | 7/1998 |
| WO | WO-9708870 | A2 | 3/1997 |
| WO | WO-9965579 | A1 | 12/1999 |
| WO | WO-0033196 | A1 | 6/2000 |
| WO | WO-00/48063 | A1 | 8/2000 |
| WO | WO-0124012 | A1 | 4/2001 |
| WO | WO-0167218 | A1 | 9/2001 |
| WO | WO-02015998 | A2 | 2/2002 |
| WO | WO-02101537 | A1 | 12/2002 |
| WO | WO-03045519 | A1 | 6/2003 |

OTHER PUBLICATIONS

*Digital Signature Standard (DSS), FIPS PUB 186-2, U.S. Department of Commerce/ National Institute of Standard and Technology*, (Jan. 27, 2000) ,72 pgs.

"U.S. Appl. No. 10/236,164 Advisory Action mailed Jun. 23, 2005", 4 pgs.

"U.S. Appl. No. 10/236,164 Final Office Action mailed Apr. 1, 2005", 15 pgs.

"U.S. Appl. No. 10/236,164 Final Office Action mailed May 17, 2007", 10 pgs.

"U.S. Appl. No. 10/236,164 Final Office Action mailed May 26, 2006", 12 pgs.

"U.S. Appl. No. 10/236,164 Non Final Office Action mailed Mar. 24, 2004", 10 pgs.

"U.S. Appl. No. 10/236,164 Non Final Office Action mailed Sep. 21, 2006", 17 pgs.

"U.S. Appl. No. 10/236,164 Non Final Office Action mailed Sep. 30, 2004", 12 pgs.

"U.S. Appl. No. 10/236,164 Non Final Office Action mailed Oct. 25, 2005", 17 pgs.

"U.S. Appl. No. 10/236,164 Notice of Allowance mailed Aug. 31, 2007", NOAR,7 pgs.

"U.S. Appl. No. 10/236,164 Response filed Jan. 23, 2006 to Non Final Office Action mailed Oct. 25, 2005", 18 pgs.

"U.S. Appl. No. 10/236,164 Response filed Feb. 21, 2007 to Non Final Office Action mailed Sep. 21, 2006", 9 pgs.

"U.S. Appl. No. 10/236,164 Response filed Feb. 27, 2005 to Non Final Office Action mailed Sep. 30, 2004", 14 pgs.

"U.S. Appl. No. 10/236,164 Response filed May 31, 2005 to Final Office Action mailed Apr. 1, 2005", 15 pgs.

"U.S. Appl. No. 10/236,164 Response filed Jun. 24, 2004 to Non Final Office Action mailed Mar. 24, 2004", 12 pgs.

"U.S. Appl. No. 10/236,164 Response filed Jul. 26, 2006 to Final Office Action mailed May 26, 2006", 7 pgs.

"U.S. Appl. No. 10/236,164 Response filed Aug. 3, 2007 to Final Office Action mailed May 17, 2007", 10 pgs.

"JFFS—Journaling Flash File System", http://web.archive.org/web/20030115142058/http://developer.axis.com/software/jffs/doc/jffs.shtml (Jan. 15, 2003),1-6.

Newton, H. , "Newton's Telecom Dictionary", *CMP Books*, (2001),p. 762.

Schneier, B., "Applied Cryptography Protocols, Algorithms, and Source Code in C", *John Wiley& Sons*, New York, XP002298839; ISBN: 0-471-12845-7, (Jan. 1, 1996), p. 431.

* cited by examiner

SECURITY OF GAMING SOFTWARE

PRIORITY APPLICATION

This application is a Continuation of U.S. patent application Ser. No. 10/236,164, filed Sep. 6, 2002 now U.S. Pat. No. 7,320,642, which is incorporated herein by reference in its entirety.

REFERENCE TO RELATED APPLICATIONS

This application is related to U.S. patent application Ser. No. 10/119,663 entitled "Gaming Software Authentication" and filed Apr. 10, 2002.

FIELD OF THE INVENTION

The present invention relates generally to gaming machines and, more particularly, to a method and system for inhibiting execution of unauthorized software on a gaming machine.

BACKGROUND OF THE INVENTION

A gaming machine is operable to conduct a wagering game such as slots, poker, keno, bingo, or blackjack. In response to a wager for purchasing a play of the game, the machine generates a random (or pseudo-random) event and provides an award to a player for a winning outcome of the random event. Occasionally, the random event may trigger a bonus game involving lively animations, display illuminations, special effects, and/or player interaction. Game outcomes are presented to the player on one or more displays, which depict the outcomes in a form that can be understood by the player.

A gaming machine typically includes an outer cabinet that houses a main central processing unit (CPU), several peripheral devices, and wiring harnesses to electrically connect the peripherals to the main CPU. The CPU may, for example, include one or more printed circuit boards carrying one or more processors, a plurality of logic devices, and one or more memory devices for storing executable program code and game data. The memory devices for storing executable code may, for example, include EPROMs, hard disk drives, Compact FLASH cards, CD-ROMs, DVDs, and Smart Media cards. The stored executable code provides two basic functions: (1) an operating system for controlling the gaming machine and controlling communications between the gaming machine and external systems or users, and (2) game code for conducting a game on the gaming machine.

Heretofore, there has been little to inhibit unauthorized persons from replacing some or all of the executable code in the main CPU with unapproved software and thereby take advantage of the machine's capabilities without authorization from the machine manufacturer. A need therefore exists for a method and apparatus for inhibiting such unauthorized activity.

SUMMARY OF THE INVENTION

A gaming machine for conducting a wagering game comprises a processing apparatus and a secondary apparatus. To inhibit unauthorized persons from replacing some or all of the software executed by the processing apparatus with unapproved software, the processing apparatus transmits a security message to the secondary apparatus. The secondary apparatus, in turn, transmits an enable signal critical to machine function in response to successful validation of the security message. The secondary apparatus may, for example, be a programmable logic circuit external to the processing apparatus.

BRIEF DESCRIPTION OF THE DRAWINGS

The foregoing and other advantages of the invention will become apparent upon reading the following detailed description and upon reference to the drawings.

Figure 1:
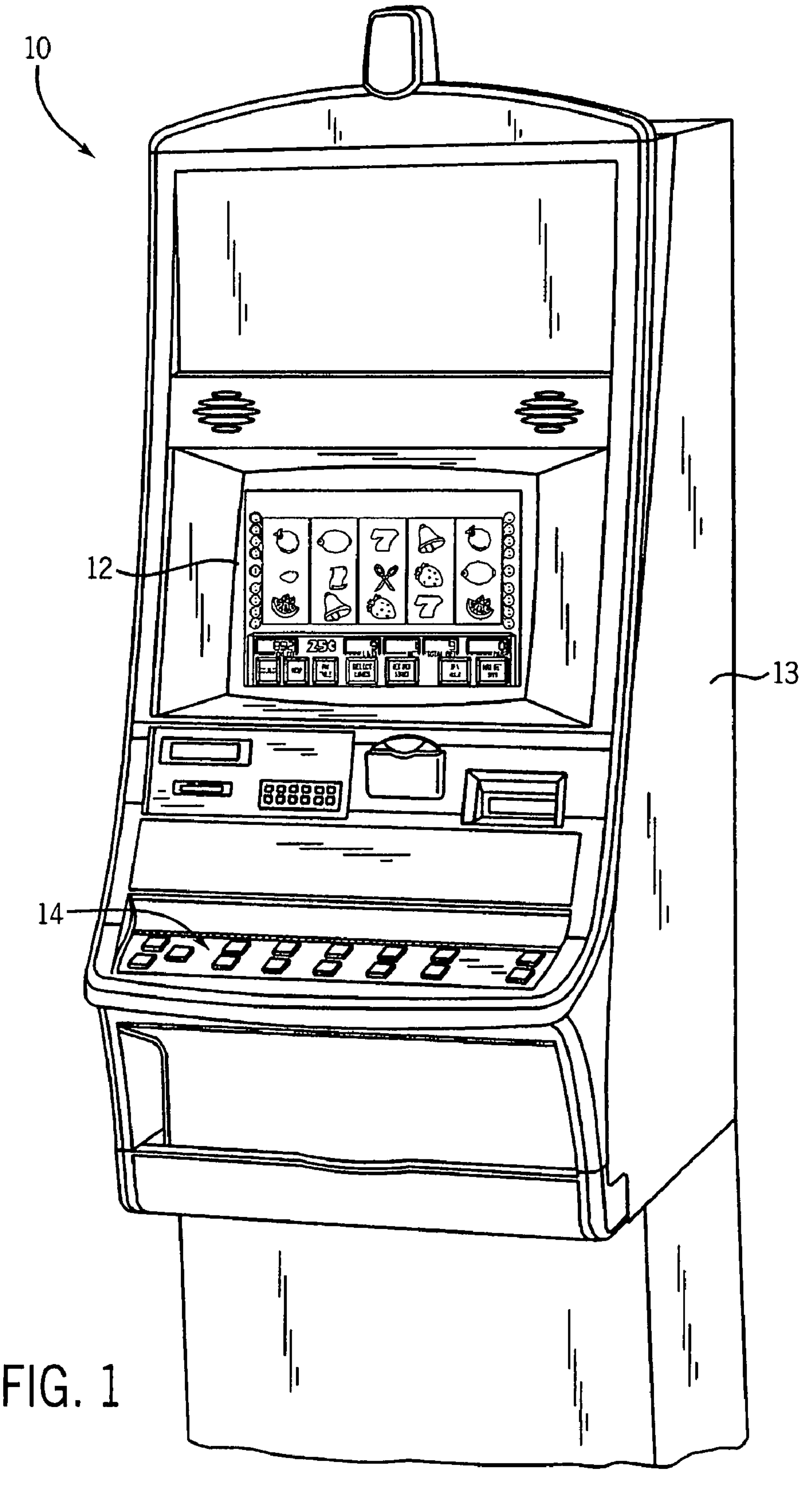
FIG. 1 is an isometric view of a gaming machine operable to conduct a wagering game.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 depicts a gaming machine 10 operable to conduct a wagering game such as slots, poker, keno, bingo, or blackjack. In response to a wager for purchasing a play of the game, the machine generates a random (or pseudo-random) event using a random number generator (RNG) and provides an award to a player for a winning outcome of the random event. Occasionally, the random event may trigger a bonus game involving lively animations, display illuminations, special effects, and/or player interaction. Game outcomes are presented to the player on at least one display 12, which depicts the outcomes in a form that can be understood by the player. The gaming machine 10 includes an outer cabinet 13 that houses a main central processing unit (CPU), several peripheral devices, and wiring harnesses to electrically connect the peripherals to the main CPU.

Figure 2:
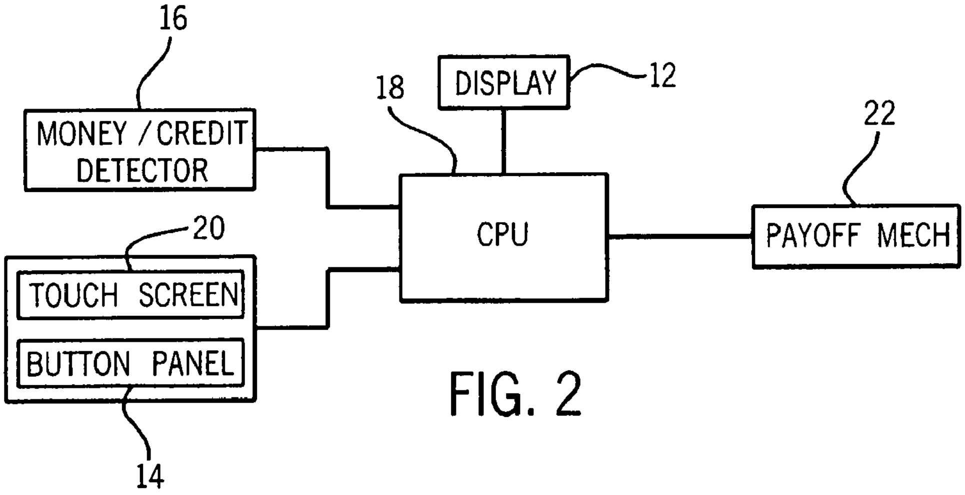
FIG. 2 is a block diagram of a control system suitable for operating the gaming machine.

FIG. 2 is a block diagram of a control system suitable for operating the gaming machine. Money/credit detector 16 signals a CPU 18 when a player has inserted money or played a number of credits. The money may be provided by coins, bills, tickets, coupons, cards, etc. Using a button panel 14 (see FIG. 1) or a touch screen 20, the player may select any variables associated with the wagering game and place his/her wager to purchase a play of the game. In a play of the game, the CPU 18 generates at least one random event using a random number generator (RNG) and provides an award to the player for a winning outcome of the random event. The CPU 18 operates the display 12 to represent the random events and outcomes in a visual form that can be understood by the player. A payoff mechanism 22 is operable in response to instructions from the CPU 18 to award a payoff to the player. The payoff may, for example, be in the form of a number of credits.

The CPU may, for example, include one or more printed circuit boards carrying one or more processors, a plurality of logic devices, and one or more memory devices for storing executable program code (software) and game data. The memory devices for storing executable code may, for example, include EPROMs, hard disk drives, Compact FLASH cards, CD-ROMs, DVDs, and Smart Media cards. The stored executable code provides two basic functions: (1) an operating system for controlling the gaming machine and controlling communications between the gaming machine and external systems or users, and (2) game code for conducting a game on the gaming machine. In operation, the CPU loads executable code and associated game data into system memory and executes the code out of system memory. The system memory may, for example, include non-volatile random access memory (NVRAM) for storing critical game data such as metering and accounting data.

Figure 3:
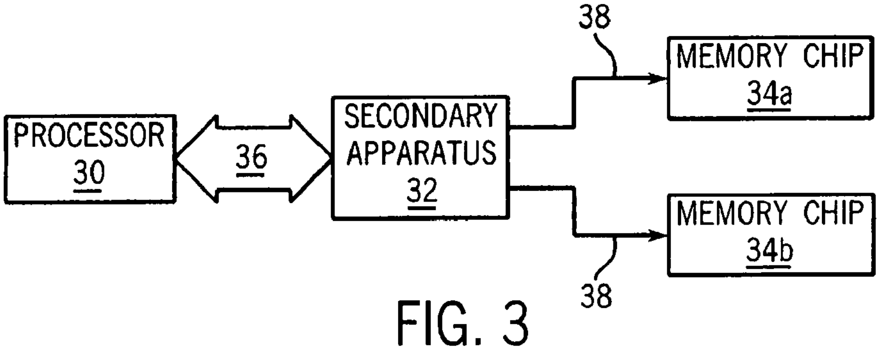
FIG. 3 is a block diagram of a security system for inhibiting execution of unauthorized software on a gaming machine.

FIG. 3 is a block diagram of a security system for inhibiting execution of unauthorized software on a gaming machine. The security system includes a processor 30, a secondary apparatus 32, and system memory 34*a-b*. The processor 30 and system memory 34*a-b* are part of the CPU in FIG. 2. The secondary apparatus 32 is preferably a programmable logic circuit, such as a field programmable gate array (FPGA). The secondary apparatus 32 may be external to and physically separated from the CPU, or internal to the CPU.

To inhibit unauthorized persons from replacing some or all of the software executed by the CPU with unapproved software, the processor 30 transmits a security message to the secondary apparatus 32 over a communications channel (bus) 36. The security message may, for example, include a string of bits (e.g., 128 bits) embedded in other message traffic transmitted by the processor 30. The string of bits may be a copyrighted or trademarked string. The secondary apparatus 32, in turn, checks the validity of the security message by comparing the security message to a reference message. If the comparison is successful (e.g., the security message matches the reference message), the secondary apparatus 32 transmits enable signals to the system memory 34*a-b* over chip-select lines 38. If, however, the comparison is unsuccessful (e.g., the security message does not match the reference message), the secondary apparatus 32 transmits disable signals to the system memory 34*a-b* over the chip-select lines 38 so that the gaming machine cannot function properly.

The system memory 34*a-b* may, for example, include non-volatile random access memory chips (NVRAM). During normal operation of the gaming machine, the CPU stores and accesses critical game data in the system memory 34*a-b*. The system memory 34*a-b* must receive the enable signals over the chip-select lines 38 in order to perform this function, which is critical to proper functioning of the gaming machine. To help disguise the existence of the security system, the enable signals may default to the enabled state when the gaming machine is first powered up and may remain enabled for a period of time before the secondary apparatus 32 checks the validity of the security message.

Figure 4:
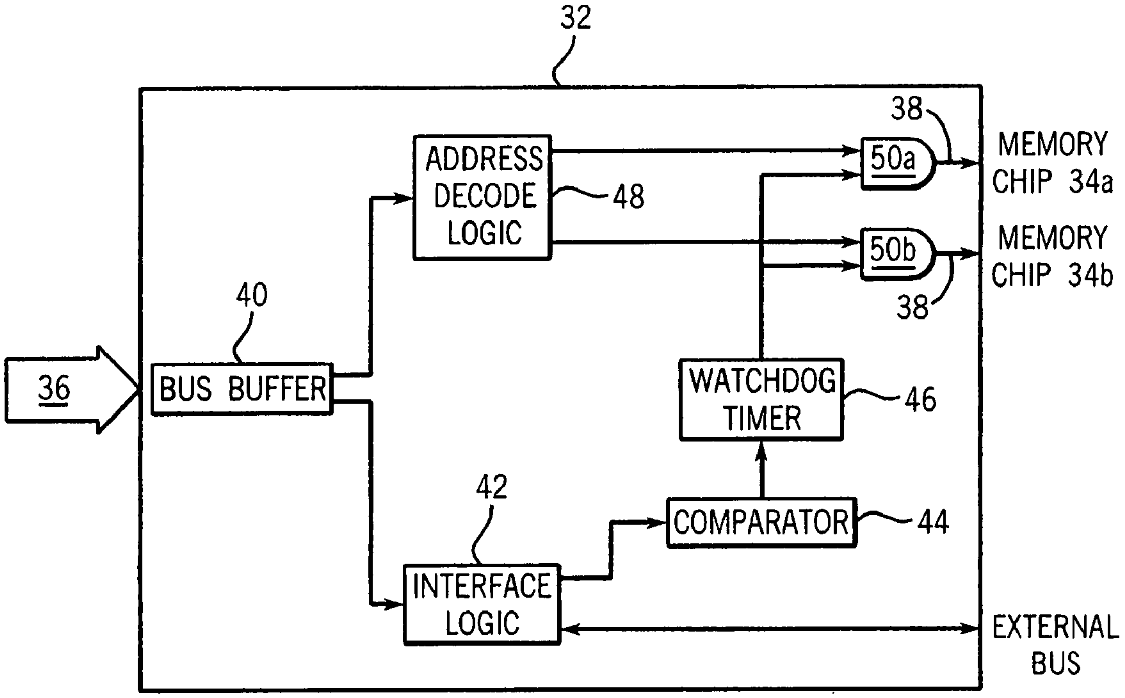
FIG. 4 is a block diagram of a secondary apparatus employed in the security system.

FIG. 4 is a block diagram of the secondary apparatus 32. A bus buffer 40 interfaces to the communications channel 36 between the secondary apparatus 32 and the processor 30. The bus buffer 40 provides a temporary storage location for data to be transmitted between the secondary apparatus 32 and the processor 30 over the communications channel 36. $I^2C$ interface logic 42 provides the necessary circuitry to drive $I^2C$ bus peripherals that may exist in the gaming machine's control system. These peripherals include a comparator 44 internal to the secondary apparatus 32 and external peripherals coupled an external bus. The comparator 44 compares the security message transmitted from the processor 30 to the secondary apparatus 32 with a reference message stored in the secondary apparatus 32. If the comparison is successful (e.g., the security message matches the reference message), the comparator 44 transmits a reset signal to a watchdog timer 46.

The watchdog timer 46 controls the enable signals critical to proper functioning of the gaming machine. If the secondary apparatus 32 receives the valid security message from the processor 30, the watchdog timer 46 will continually enable proper functioning of the gaming machine, e.g., by transmitting enable signals to the system memory 34*a-b* over the chip-select lines 38. If the secondary apparatus 32 does not receive the valid security message from the processor 30, the comparator 44 does not reset the watchdog timer 46 and, as a result, the timer 46 will transmit disable signals to the system memory 34*a-b* over the chip-select lines 38. Address decode logic 48 provides individual control of the chip-select lines 38 based upon the system memory address that is requested from the processor 30.

The watchdog timer 46 automatically disables the enable signals if the secondary apparatus 32 does not periodically receive the correct security message from the processor 30 at regular or pseudo-random refresh time intervals. A pseudo-random refresh interval (e.g., a refresh interval with a random offset) makes it more difficult to observe periodic behavior for the security message, identify the presence of the watchdog timer, and thereby defeat the security system. The refresh interval is sufficiently long (e.g., twenty minutes) to reduce the possibility of "sniffing" or detecting the security message over the communications channel 36.

The security system embodying the present invention may be enhanced in various ways to make it more difficult for unscrupulous persons to defeat the security system. For example, the enable signals may be dynamic, as opposed to static, by varying the state of the enable signals over time and in an unpredictable or random manner. The enable signals preferably originate internal to the secondary apparatus 32 to minimize the ability to observe the signals. Alternatively, the enable signals may originate external to the secondary apparatus 32 and be "passed through" the apparatus 32.

Further, the security system may utilize a non-transferable digital signature. In this instance, the secondary apparatus 32 generates a random number and transmits an original message containing the random number to the processor 30. The processor 30 then encrypts the message using a private key and transmits the encrypted message back to the secondary apparatus 32. The secondary apparatus 32 decrypts the encrypted message using a public key (to regenerate the random number) and checks the validity of the decrypted message by comparing the decrypted message to the original message transmitted by the secondary apparatus 32 to the processor 30. If the comparison is successful (e.g., the decrypted message matches the original message), the secondary apparatus 32 transmits enable signals to the system memory 34*a-b* over the chip-select lines 38. If, however, the comparison is unsuccessful (e.g., the decrypted message does not match the original message), the secondary apparatus 32 disables these signals so that the gaming machine cannot function properly.

While the present invention has been described with reference to one or more particular embodiments, those skilled in the art will recognize that many changes may be made thereto without departing from the spirit and scope of the present invention. For example, instead of transmitting an enable signal to the system memory 34*a-b* in response to successful validation of the security message, the secondary apparatus 32 may transmit the enable signal to some other component that is critical to machine function. Each of these embodiments and obvious variations thereof is contemplated as falling within the spirit and scope of the claimed invention, which is set forth in the following claims:

What is claimed is:

1. A gaming machine to conduct a wagering game, the gaming machine comprising:

a processing apparatus to transmit a security message;

a secondary apparatus to receive and validate the security message, the secondary apparatus to transmit an enable signal in response to successful validation of the security message and transmit a disable signal in response to an unsuccessful validation of the security message; and a gaming machine component to receive the enable or disable signal, the gaming machine component to allow the processing apparatus access to game data after receipt of the enable signal and deny the processing apparatus access to game data after receipt of the disable signal.

2. The machine of claim 1, wherein the gaming machine component includes a system memory to store game data.

3. The machine of claim 1, wherein the processing apparatus periodically transmits the security message.

4. The machine of claim 3, wherein the security message is periodically transmitted at regular intervals.

5. The machine of claim 3, wherein the security message is periodically transmitted using a pseudo-random refresh time interval.

6. The machine of claim 1, wherein the secondary apparatus is external to the processing apparatus.

7. The machine of claim 1, wherein the secondary apparatus compares the received security message with a reference message and transmits the enable signal in response to a successful comparison.

8. The machine of claim 1, wherein the secondary apparatus is physically separate from the processing apparatus.

9. The machine of claim 1, wherein the secondary apparatus is contained within the processing apparatus.

10. The machine of claim 1, wherein the secondary apparatus disables the enable signal when the security message is not received from the processing apparatus.

11. The machine of claim 1, wherein the enable signal is dynamic.

12. The machine of claim 1, wherein the enable signal originates internal to the secondary apparatus.

13. The machine of claim 1, wherein the enable signal originates external to the secondary apparatus.

14. A computer-implemented method comprising:

transmitting a security message from a processing apparatus to a secondary apparatus;

validating the security message with the secondary apparatus;

transmitting, from the secondary apparatus to a gaming machine component, an enable signal in response to a successful validation of the security message, wherein after receiving the enable signal, the gaming machine component allows the processing apparatus to access game data; and transmitting, from the secondary apparatus to the gaming machine component, a disable signal in response to an unsuccessful validation of the security message, wherein after receiving the disable signal, the gaming machine component prevents the processing apparatus from accessing game data.

15. The computer-implemented method of claim 14, wherein the gaming machine component includes a system memory to store game data.

16. The computer-implemented method of claim 14, wherein the transmitting the security message is performed periodically.

17. The computer-implemented method of claim 16, wherein the transmitting the security message is performed at regular intervals.

18. The computer-implemented method of claim 16, wherein the transmitting the security message is performed using a pseudo-random refresh time interval.

19. The computer-implemented method of claim 14, wherein the validating the security message includes comparing the received security message with a reference message, and wherein the transmitting an enable signal includes transmitting the enable signal in response to a successful comparison between the received security message and the reference message.

20. The computer-implemented method of claim 14, further including disabling the enable signal when the security message is not received from the processing apparatus.

21. The computer-implemented method of claim 14, wherein the transmitting the security message includes embedding the security message in other message traffic.

22. The computer-implemented method of claim 14, further including:

transmitting an initial message from the secondary apparatus to the processing apparatus;

encrypting the initial message with the processing apparatus; and decrypting the encrypted message with the secondary apparatus, wherein the transmitting the security message includes transmitting the encrypted message, and wherein the validating the security message includes comparing the decrypted message to the initial message.

23. The computer-implemented method of claim 22, wherein the initial message includes a random number.

* * * * *